(12) United States Patent
Kingsbury

(10) Patent No.: US 9,390,370 B2
(45) Date of Patent: Jul. 12, 2016

(54) TRAINING DEEP NEURAL NETWORK ACOUSTIC MODELS USING DISTRIBUTED HESSIAN-FREE OPTIMIZATION

(71) Applicant: International Business Machines Corporation, Armonk, NY (US)

(72) Inventor: Brian E. D. Kingsbury, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 13/783,812

(22) Filed: Mar. 4, 2013

(65) Prior Publication Data

US 2014/0067738 A1 Mar. 6, 2014

Related U.S. Application Data

(60) Provisional application No. 61/693,986, filed on Aug. 28, 2012.

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06N 3/08 | (2006.01) |
| G06N 3/04 | (2006.01) |

(52) U.S. Cl.
CPC ............... *G06N 3/08* (2013.01); *G06N 3/0454* (2013.01); *G06N 3/084* (2013.01)

(58) Field of Classification Search
None
See application file for complete search history.

(56) References Cited

U.S. PATENT DOCUMENTS

| 5,649,066 A * | 7/1997 | Lacher | G06N 3/0427 706/25 |
| 2004/0059695 A1 * | 3/2004 | Xiao | G06N 3/082 706/25 |

OTHER PUBLICATIONS

Minyoung Kim; Rutgers University; Pavlovic, V., Discriminative Learning of Mixture of Bayesian Network Classifiers for Sequence Classification, Jun. 17-22, 2006, IEEE, http://ieeexplore.ieee.org/xpls/abs_all.jsp?arnumber=1640769&tag=1.*

Robert Prouty, Adaptive Execution of Data Parallel Computations on Networks of Heterogeneous Workstations, Mar. 1994, Portland State University, http://pdxscholar.library.pdx.edu/cgi/viewcontent.cgi?article=1016&context=compsci_fac.*

(Continued)

*Primary Examiner* — Kakali Chaki
*Assistant Examiner* — Viker Lamardo
(74) *Attorney, Agent, or Firm* — Daniel P. Morris, Esq.; Otterstedt, Ellenbogen & Kammer, LLP

(57) ABSTRACT

A method for training a neural network includes receiving labeled training data at a master node, generating, by the master node, partitioned training data from the labeled training data and a held-out set of the labeled training data, determining a plurality of gradients for the partitioned training data, wherein the determination of the gradients is distributed across a plurality of worker nodes, determining a plurality of curvature matrix-vector products over the plurality of samples of the partitioned training data, wherein the determination of the plurality of curvature matrix-vector products is distributed across the plurality of worker nodes, and determining, by the master node, a second-order optimization of the plurality of gradients and the plurality of curvature matrix-vector products, producing a trained neural network configured to perform a structured classification task using a sequence-discriminative criterion.

16 Claims, 5 Drawing Sheets

(56) References Cited

OTHER PUBLICATIONS

Kiho Kwak, Daniel F. Huber, Jeongsook Chae, and Takeo Kanade, Boundary Detection Based on Supervised Learning, May 3-8, 2010, IEEE International Conference on Robotics and Automation, https://www.ri.cmu.edu/pub_files/2010/5/1983.pdf.*

Prouty et al.—Adaptive Execution of Data Parallel Computations on Networks of Heterogeneous Workstations—1994.*

Kwak et al.—Boundary Detection Based on Supervised Learning—May 8, 2010.*

Prouty et al.—Adaptive Execution of Data Parallel Computations on Networks of Heterogeneous Works.*

James Martens—Deep learning via Hessian-free optimization—2010.*

James Martens, Deep learning via Hessian-free optimization, Proceedings of the 27th International Conference on Machine Learning, Haifa, Israel, Jun. 2010, pp. 1-8.

* cited by examiner

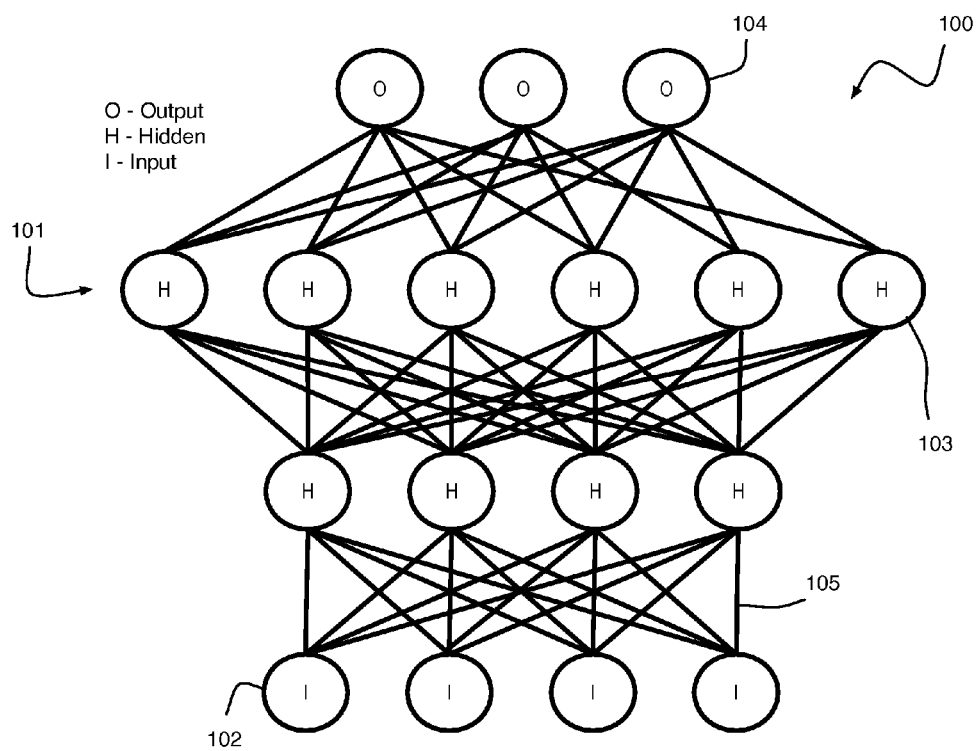
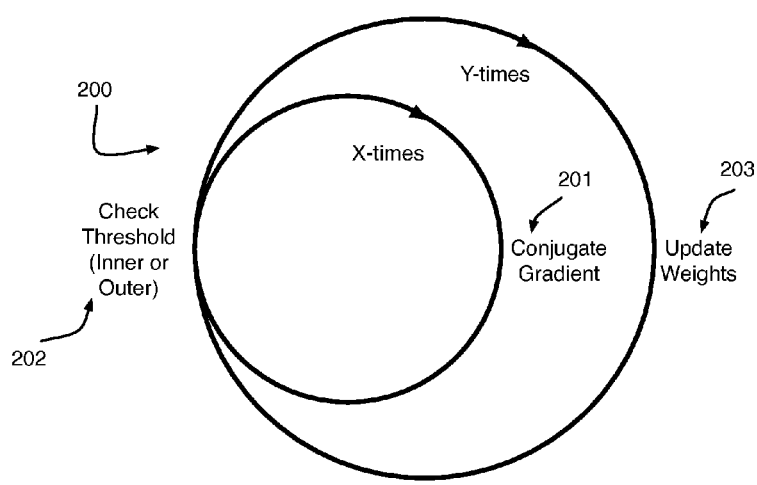
FIG. 2

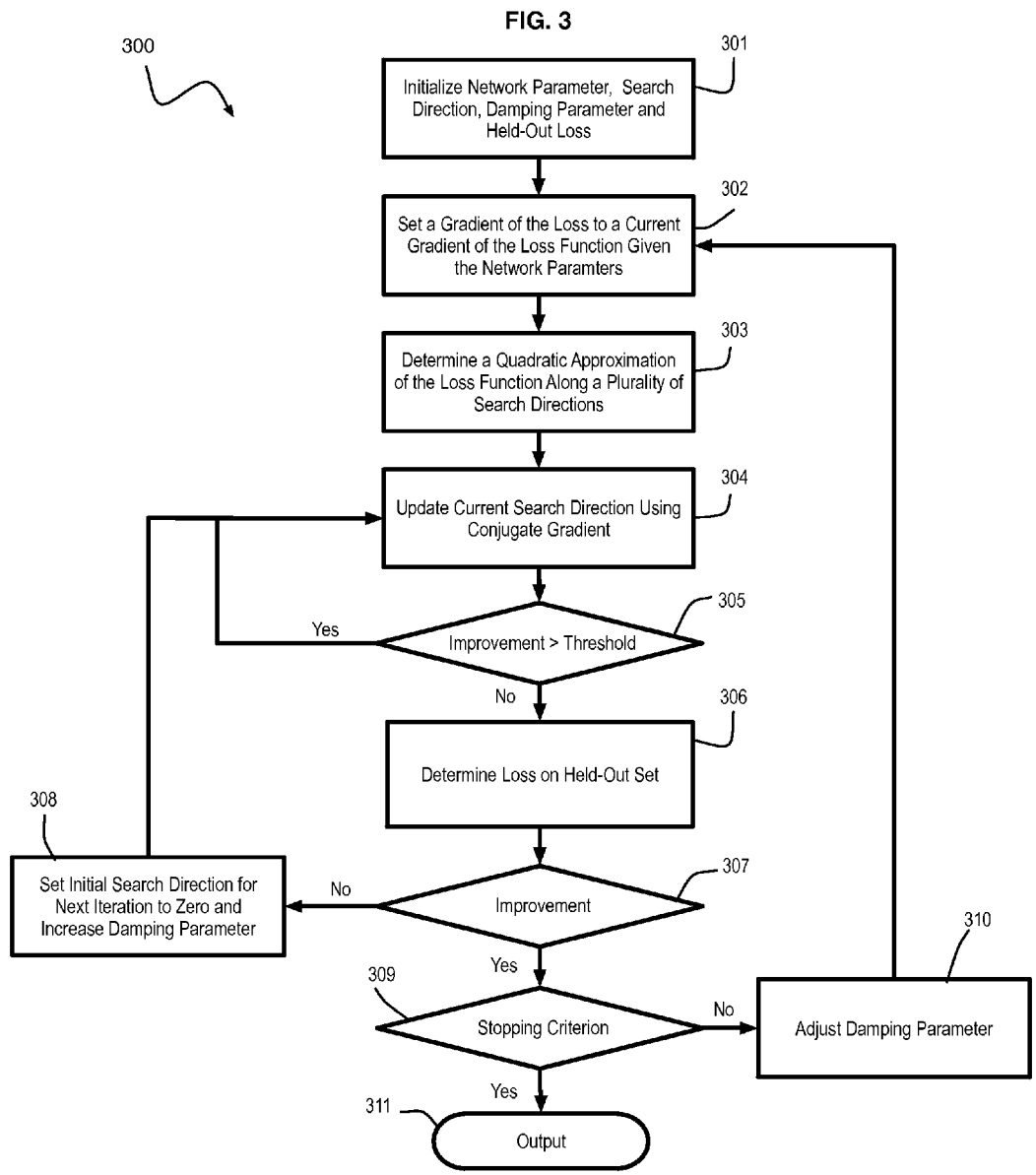

FIG. 4 ln. 401  initialize $\theta$; $d_0 \leftarrow 0$; $\lambda \leftarrow \lambda_0$; $\mathcal{L}_{prev} \leftarrow \mathcal{L}(\theta)$
while not converged do
  $g \leftarrow \nabla \mathcal{L}(\theta)$
ln. 402  Let $q_\theta(d) = \nabla \mathcal{L}(\theta)^T d + \frac{1}{2} d^T (G(\theta) + \lambda I) d$
ln. 403  $\{d_1, d_2, \ldots, d_N\} \leftarrow$ CG-MINIMIZE$(q_\theta(d), d_0)$
  $\mathcal{L}_{best} \leftarrow \mathcal{L}(\theta + d_N)$
ln. 404  for $i \leftarrow N-1, N-2, \ldots, 1$ do      ▷ *backtracking*
    $\mathcal{L}_{curr} \leftarrow \mathcal{L}(\theta + d_i)$
    if $\mathcal{L}_{prev} \geq \mathcal{L}_{best} \wedge \mathcal{L}_{curr} \geq \mathcal{L}_{best}$ then
      $i \leftarrow i + 1$
      break
    $\mathcal{L}_{best} \leftarrow \mathcal{L}_{curr}$
  if $\mathcal{L}_{prev} < \mathcal{L}_{best}$ then
    $\lambda \leftarrow \frac{3}{2}\lambda$; $d_0 \leftarrow 0$
    continue
  $\rho = (\mathcal{L}_{prev} - \mathcal{L}_{best})/q_\theta(d_N)$
  if $\rho < 0.25$ then
    $\lambda \leftarrow \frac{2}{3}\lambda$
  else if $\rho > 0.75$ then
    $\lambda \leftarrow \frac{3}{2}\lambda$
ln. 405  $\theta \leftarrow \theta + \alpha d_i$; $d_0 \leftarrow \beta d_N$; $\mathcal{L}_{prev} \leftarrow \mathcal{L}_{best}$

TRAINING DEEP NEURAL NETWORK ACOUSTIC MODELS USING DISTRIBUTED HESSIAN-FREE OPTIMIZATION

CROSS REFERENCE TO RELATED APPLICATION

This application claims priority to U.S. Provisional Patent Application Ser. No. 61/693,986, filed Aug. 28, 2012, the contents of which are hereby incorporated by reference in its entirety.

This invention was made with Government support under Contract No.: D11PC20192 (Defense Advanced Research Projects Agency (DARPA)). The Government has certain rights in this invention.

BACKGROUND

The present disclosure relates generally to machine learning, and more particularly, to methods for training of deep neural network models to perform structured classification tasks.

Neural networks are simplified models of the brain comprising units associated by weighted connections. A weight on a connection reveals the strength of the connection.

Neural networks have demonstrated an ability to learn such skills as face recognition, reading, and the detection of simple grammatical structure. More particularly, neural networks can be considered to be models defining a multivariate function or a distribution over a set of discrete classes. In some instances, neural network models can be associated with a particular learning method or learning rule.

The use of neural networks for machine learning tasks, including acoustic modeling for speech recognition, is well known. The ability to train increasingly deep networks has been due, in part, to the development of pre-training algorithms and forms of random initialization, as well as the availability of faster computers.

BRIEF SUMMARY

According to an embodiment of the present disclosure, a method for training a neural network includes receiving labeled training data at a master node, generating, by the master node, partitioned training data from the labeled training data and a held-out set of the labeled training data, determining a plurality of gradients for the partitioned training data, wherein the determination of the gradients is distributed across a plurality of worker nodes, determining a plurality of curvature matrix-vector products over the plurality of samples of the partitioned training data, wherein the determination of the plurality of curvature matrix-vector products is distributed across the plurality of worker nodes, and determining, by the master node, a second-order optimization of the plurality of gradients and the plurality of curvature matrix-vector products, producing a trained neural network configured to perform a structured classification task using a sequence-discriminative criterion.

According to an embodiment of the present disclosure, a computer program product is provided for training a neural network, the computer program product comprising computer readable storage medium having program code embodied therewith, the program code readable by a processor to receive labeled training data, generate partitioned training data from the labeled training data and a held-out set of the labeled training data, assign the partitioned training data to a plurality of worker nodes, receive a plurality of gradients and a plurality of curvature matrix-vector products from the plurality of worker nodes, and determine a second-order optimization of the plurality of gradients and the plurality of curvature matrix-vector products, using the held-out set, producing a trained neural network configured to perform a structured classification task using a sequence-discriminative criterion.

According to an embodiment of the present disclosure, a system for training deep neural network acoustic models includes a plurality of distributed worker computing devices configured to perform data-parallel computation of gradients and curvature matrix-vector products, and a master computing device connected to the plurality of distributed worker computing devices by inter-process communication flow, wherein the master computing device is configured to determine a second-order optimization given the gradients and the curvature matrix-vector products and to coordinate activity of the plurality of distributed worker computing devices.

BRIEF DESCRIPTION OF THE SEVERAL VIEWS OF THE DRAWINGS

Preferred embodiments of the present disclosure will be described below in more detail, with reference to the accompanying drawings:

FIG. 1 is an exemplary deep neural network according to an embodiment of the present disclosure;

FIG. 2 is an illustration of a method for training a deep neural network according to an embodiment of the present disclosure;

FIG. 3 is a flow diagram of a method for training a deep neural network according to an embodiment of the present disclosure;

FIG. 4 is an illustration of an exemplary pseudo-code for a method for training a deep neural network according to an embodiment of the present disclosure;

DETAILED DESCRIPTION

Figure 5:
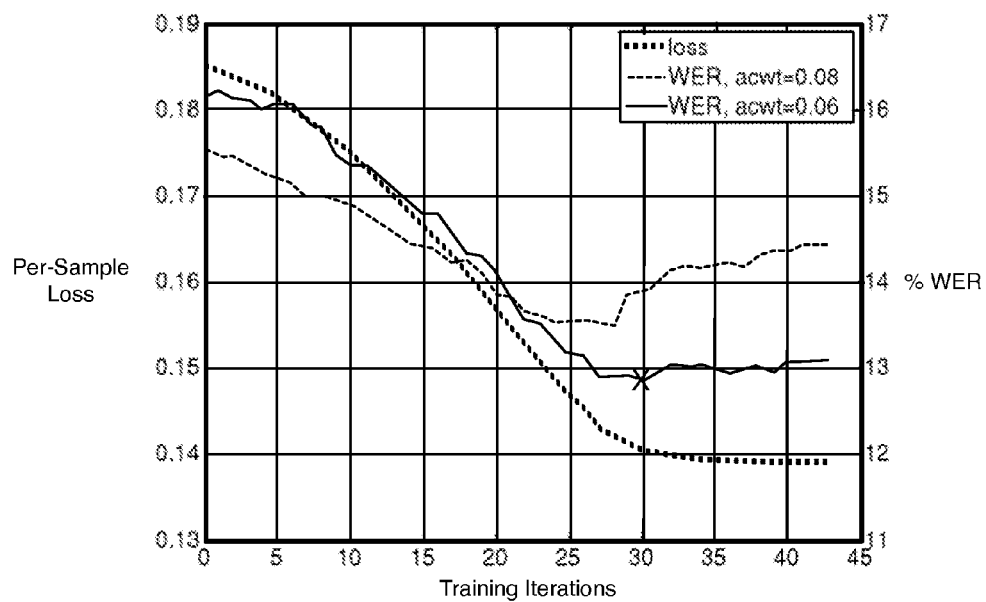
FIG. 5 is a graph of held-out loss and dev04f word error rate (WER) as a function of training iterations on a 50-hour broadcast news task.

Embodiments of the present disclosure relate to a method of training deep neural network models. According to an embodiment of the present disclosure, a Hessian-free optimization can be combined with a structured loss function to account for a variety of decisions. The loss function can be based on an expected Hidden Markov Model state error rate, maximum mutual information, boosted maximum mutual information, and the like. More specifically, a Hessian-free optimization can be distributed across a plurality of processing nodes to train a deep neural network model.

According to an embodiment of the present disclosure, a Hessian-free optimization having a structured loss function accounts for more than local decisions. An exemplary Hessian-free optimization having a structured loss function can be applied to machine learning tasks in general where multiple, local decisions can be combined to make a larger-scale decision (e.g., a structured classification), and where local decisions can be made using a deep neural network, for example, in the field of speech recognition. Other exemplary practical applications can include handwriting recognition and video processing.

Deep neural network models are neural networks having multiple hidden layers. With a deep neural network, each hidden layer determines a non-linear transformation of a previous layer. The training of deep neural networks may be considered a non-convex problem. That is, illustrated as a graph, a non-convex function (e.g., the loss of the neural network, treated as a function of its weights) can have many local minima.

Referring to FIG. 1, a deep neural network 100 comprises a plurality of units 101, including input units 102, hidden units 103 and output units 104. The units 101 can be connected by edges, e.g., 105, which can be weighted according to the strength of the edges. It should be understood that deep neural networks typically have four or more hidden layers, and that FIG. 1 is merely an example used for describing exemplary embodiments. That is, the present disclosure is not limited to two hidden layers as shown in FIG. 1.

According to an embodiment of the present disclosure, a deep neural network is a model configured to process data using a connectionist approach. The neural network model can be trained according to certain data, hereinafter referred to as training data. The training data can be labeled, for example, where a user can produce a verbatim transcript of the training audio and label the training data at the word level. Well-known automated methods can then be used to produce a more detailed labeling in terms of hidden Markov model states.

Training comprises setting the weights of the edges within the deep neural network, wherein a trained deep neural network will produce a correct output for a given input. The training data can include, for example, English broadcast news, conversational American English telephony data, Levantine Arabic, etc. For speech related applications the training data may include speech having various accents, dialects, languages, etc. That is, embodiments of the present disclosure are applicable to a variety of speech recognition tasks. It should be understood that embodiments of the present disclosure can be applied to various training data and that the present disclosure is not limited to any particularly embodiment described here.

According to an embodiment of the present disclosure, a master/worker architecture can be used to perform a distributed training of the deep neural network. Here, worker processes can be divided and distributed over a computer cluster to perform data-parallel computation of losses, gradients and curvature matrix-vector products. For example, the master can partition the data into pieces of approximately equal size, and assign each part to a different worker. The master can implement the Hessian-free optimization and coordinate the activity of the workers. Communication between the master and workers can be conducted via sockets, etc.

It is understood that embodiments of the present disclosure include cloud-computing environments. Indeed, embodiments of the present disclosure are capable of being implemented in conjunction with any other type of computing environment now known or later developed.

Cloud computing is a model of service delivery for enabling convenient, on-demand network access to a shared pool of configurable computing resources (e.g., workers) that can be rapidly provisioned and released with minimal management effort or interaction with a provider of the service. A cloud-computing environment is service oriented with a focus on statelessness, low coupling, modularity, and semantic interoperability. At the heart of cloud computing is an infrastructure comprising a network of interconnected computer devices or nodes (e.g., master nodes and worker nodes), for example, see FIG. 6.

Given a specific task to solve, e.g., machine translation of speech, and a class of functions, learning means using a set of observations to adjust the parameters of a model that can be used to solve the task. According to an embodiment of the present disclosure, this entails defining a loss function that, for an optimal solution, provides that no less desirable solution has a cost less than the cost of the optimal solution.

The cost function is a measure of how far away a particular solution is from an optimal solution for the task to be solved. A learning method searches through a solution space to find a function that has a smallest cost.

Turning to a description of the Hessian-free optimization according to an embodiment of the present disclosure; a Hessian-free optimization can be designed for the training of deep neural networks for input data. An optimization according to an embodiment of the present disclosure can take inputs including: (1) training audio, represented as a collection of sequences of fixed-dimensionality feature vectors computed from the training audio; (2) a representation of the correct, reference word transcripts and how the words of the reference word transcripts align to the audio; and (3) a representation of the word sequences to which an initial acoustic model assigns high scores and how these words align to the audio. Inputs (2) and (3) can be structured as lattices, with (2) called "numerator lattices" and (3) called "denominator lattices." It should be understood that a threshold can be used to determine a high score sufficient to be used in (3). The threshold can be predetermined, set by a user, etc.

A lattice can be a graph that represents a plurality of word sequences, including word start and end times. The numerator lattices can be generated by using an initial acoustic model to perform speech recognition, with the speech recognition constrained to produce output that is consistent with the reference transcription. The denominator lattices can be the product of unconstrained speech recognition of the training audio, using the initial acoustic model. Lattices can be produced by keeping track of multiple recognition hypotheses in the speech recognition process.

Referring to FIG. 2, in a method training a deep neural network 200 includes performing a Hessian-free optimization on input data including weights to form a quadratic approximation of a loss function, wherein the quadratic approximation can be reduced using conjugate gradient iterations of inner loop 201. The iterations of inner loop 201 can be controlled by a first (inner) threshold at 202, whereupon the satisfaction of the threshold results in update of the weights in outer loop 203. The outer loop 203 can be further controlled by a second (outer) threshold at 202, whereupon the satisfaction of the second threshold results in termination of training. In FIG. 2, X and Y are positive integers representing a number of iterations of the respective first and second loops.

Referring to FIG. 3, in a method training a deep neural network 300, network parameters, a search direction, a damping parameter and a held-out loss can be initialized at block 301. Here, the data is divided into training data, which is used to learn network parameters, and a held-out set, which is used to monitor the performance of the network. This division can be static (e.g., not adjusted) during training. The network parameters can include a set of weights (e.g., weights on layers of the deep neutral network) and biases. The initial search direction can be set to zero. The damping parameter indirectly limits the size of the weight updates by adding a constant, positive curvature term to the quadratic approximation of the loss.

At block 302, the gradient of a loss function is determined for a portion of the training data. The portion can be, e.g., 5%, 30%, or all training data except for the held-out set, etc. In the iterative processes, the gradient is updated to a current gradient of the loss function given the network parameters (discussed below) after every update.

A quadratic approximation of the loss function is determined at block 303. The quadratic approximation to the loss function can be applied for all possible search directions. The curvature term in the approximation can be determined over a subset of the training data, e.g. 1%, 5%, 10% or all the data. Note that the gradient and curvature determinations can use different subsets of data, and that these subsets are only changed at blocks 302 and 303.

In the master/worker environment, each time the quadratic approximation of the loss is determined at block 303, the workers can each select a random sample of their part of the training data to use in the curvature-vector products. In a case where the gradient is determined on only part of the training data, the workers can perform the sampling at block 302. The current search direction can be updated in block 304 by running one step of the conjugate gradient. At block 305, if the update to the search direction reduces the quadratic approximation of the loss function by less than a target amount, for example 0.5%, the loop terminates. Note that blocks 304 and 305 together implement a truncated conjugate gradient search. The result of blocks 304 and 305 includes a set of search directions. At block 306, each search direction is tested in turn to determine if it reduces the loss on the held-out set. At block 307, if no search direction improves the held-out loss, that is, a loss determined for the held-out set, the search direction can be re-set to zero and the damping parameter increased at block 308. Otherwise, if a best search direction among the set of search directions is used to update the network parameters, a check can be made for a stopping criterion at block 309, for example, based on the magnitude of the gradient. If the stopping criterion is not met at block 309, then the damping parameter can be adjusted at block 310. That is, the improvement in the loss predicted by the quadratic approximation is compared to the actual improvement in the held out loss. If the quadratic approximation overestimates, ρ, the improvement, (see FIG. 4), the damping parameter can be increased, and wherein if the quadratic approximation underestimates the improvement the damping parameter can be decreased. The adjustments to the damping parameter can be triggered by an overestimate or underestimate greater than a threshold, such that small misses may not result in an adjustment of the damping parameter. At block 309, if the stopping criterion is met, the method can output the trained network parameters at block 311.

More particularly, consider the following in view of FIG. 4, showing an exemplary method for a Hessian-free optimization. It should be noted that the method of FIG. 4 does not include the use of a pre-conditioner. Gradients can be determined over a portion of, or all of, the training data.

Referring to FIG. 4, at line 401, let $\theta$ denote certain network parameters (e.g., weights for layers), $L(\theta)$ denote a loss function, $\nabla L(\theta)$ denote a gradient of the loss with respect to the network parameters, d denote a search direction, and $B(\theta)$ denote a matrix characterizing a curvature of the loss around $\theta$. At line 402, a Hessian-free optimization can iteratively form a quadratic approximation of the loss function $L(\theta)$, for example, presented as follows, $$\mathcal{L}(\theta+d) \approx \mathcal{L}(\theta) + \nabla \mathcal{L}(\theta)^T d + \tfrac{1}{2} d^T B(\theta) d.$$

At line 403, the quadratic approximation can be minimized using a conjugate gradient (CG), which accesses a curvature matrix through matrix-vector products $B(\theta)d$.

If $B(\theta)$ were the Hessian matrix and the CG were run to convergence, the approximation is a matrix-free Newton method. It should be understood that the Hessian matrix is a square matrix of second-order partial derivatives of a function and describes the local curvature of a function of many variables.

In a Hessian-free method according to an embodiment of the present disclosure, the CG search can be truncated based on a relative improvement in approximate loss and the curvature matrix is a Gauss-Newton matrix G. The Gauss-Newton matrix is guaranteed positive semi-definite, with additional damping. That is, the Gauss-Newton matrix can be written as:

$$G(\theta) + \lambda I,$$

wherein $\lambda$ is a damping parameter and I is the identity matrix. The damping parameter $\lambda$ can be used to control how conservative the quadratic approximation of the loss is.

It should be understood that the Hessian-free method determines a matrix-vector product without needing to determine the Hessian matrix.

More particularly, a Gauss-Newton approximation can be used to determine an approximation of the Hessian matrix. Gauss-Newton matrix-vector products are determined over each of a plurality of samples. The samples may be about 1% of the training data, such that matrix-vector products of curvature are determined across discrete batches of the training data.

The loss function, $L(\theta)$, is determined over a held-out set. The held-out set can include a portion of the input data from which samples are taken, such that results can be compared to the held-out set to ensure improvement. CG-Minimize ($q_\theta(d)$ $d_0$) uses conjugate gradient to minimize $q_\theta(d)$, starting with search direction $d_0$. This function returns a series of proposed weight updates $\{d_1, d_2, \ldots, d_N\}$. These proposed steps can be used in a backtracking procedure.

Beginning at line 404, the backtracking procedure determines the held-out loss for each proposed step/weight update, and selects the update that produces the best held-out loss.

At line 405, the parameter update, $\theta \leftarrow \theta + \alpha d_t$ using the Armijo rule backtracking line search. The Armijo rule backtracking line search starts with some initial step size $\alpha 0$ and then gradually reduces it by a constant factor $\beta$ until the condition $f(x+\alpha b) > f(x) + \sigma \alpha \nabla f(x)^T d$ is satisfied. Here, d is the descent direction, $f(x)$ is the objective function, $\nabla f(x)$ is the gradient of the objective function, $\sigma \in (0, 0.5)$ and $\beta \in (0, 1)$ are parameters, and $\alpha$ is the step size. It should be understood that smaller values of $\beta$ yield faster and less accurate searches while larger values of $\beta$ yield slower and more accurate searches.

FIG. 5 is a graph of held-out loss and dev04f word error rate (WER) as a function of training iterations on a 50-hour broadcast news task. The "X" marks the best dev04f word error rate in the plot.

Figure 6:
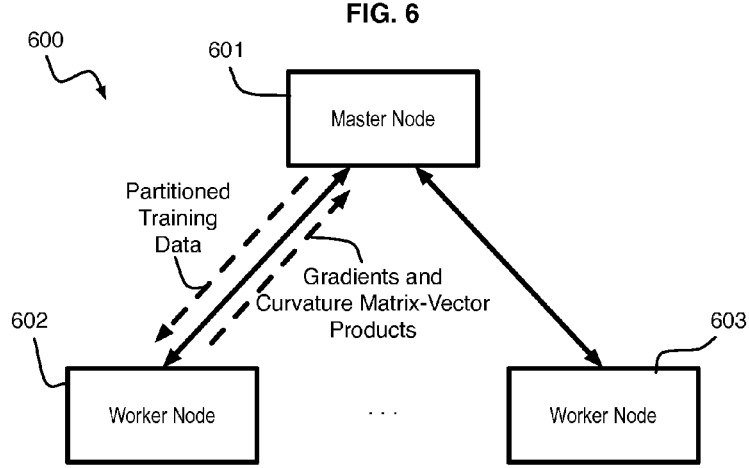
FIG. 6 is a diagram of an exemplary distributed computer environment according to an embodiment of the present disclosure.

FIG. 6 is an exemplary distributed computer system 600 including a master node 601 and a number of worker nodes 602-603. The master node 601 can partition the data into pieces of approximately equal size, and assign each part to a different worker node, e.g., 602 or 603. The master node 601 can implement the Hessian-free optimization and coordinate the activity of the worker nodes 602-603, which determine the gradients and the curvature-vector products from the training data. Communication between the master and workers can be conducted via Transmission Control Protocol/Internet Protocol (TCP/IP) sockets, for example. In an exemplary embodiment TCP/IP sockets enable an inter-process communication flow between the master node and the worker nodes.

In view of the foregoing, it should be understood that principles of the present disclosure are applicable to a variety of problems. According to an embodiment of the present disclosure, a Hessian-free optimization can be combined with a structured loss function that accounts for more than local decisions. Exemplary embodiments can be applicable to speech recognition, machine learning tasks where multiple, local decisions are combined to make a larger-scale decision (the jargon is "structured classification"), and where the local decisions are made using a deep neural network. Other practical applications can include handwriting recognition, video processing, etc. While various exemplary applications are discussed, these examples are not limiting, and one of ordinary skill in the art would understand that further examples are possible within the scope of the present disclosure.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 7:
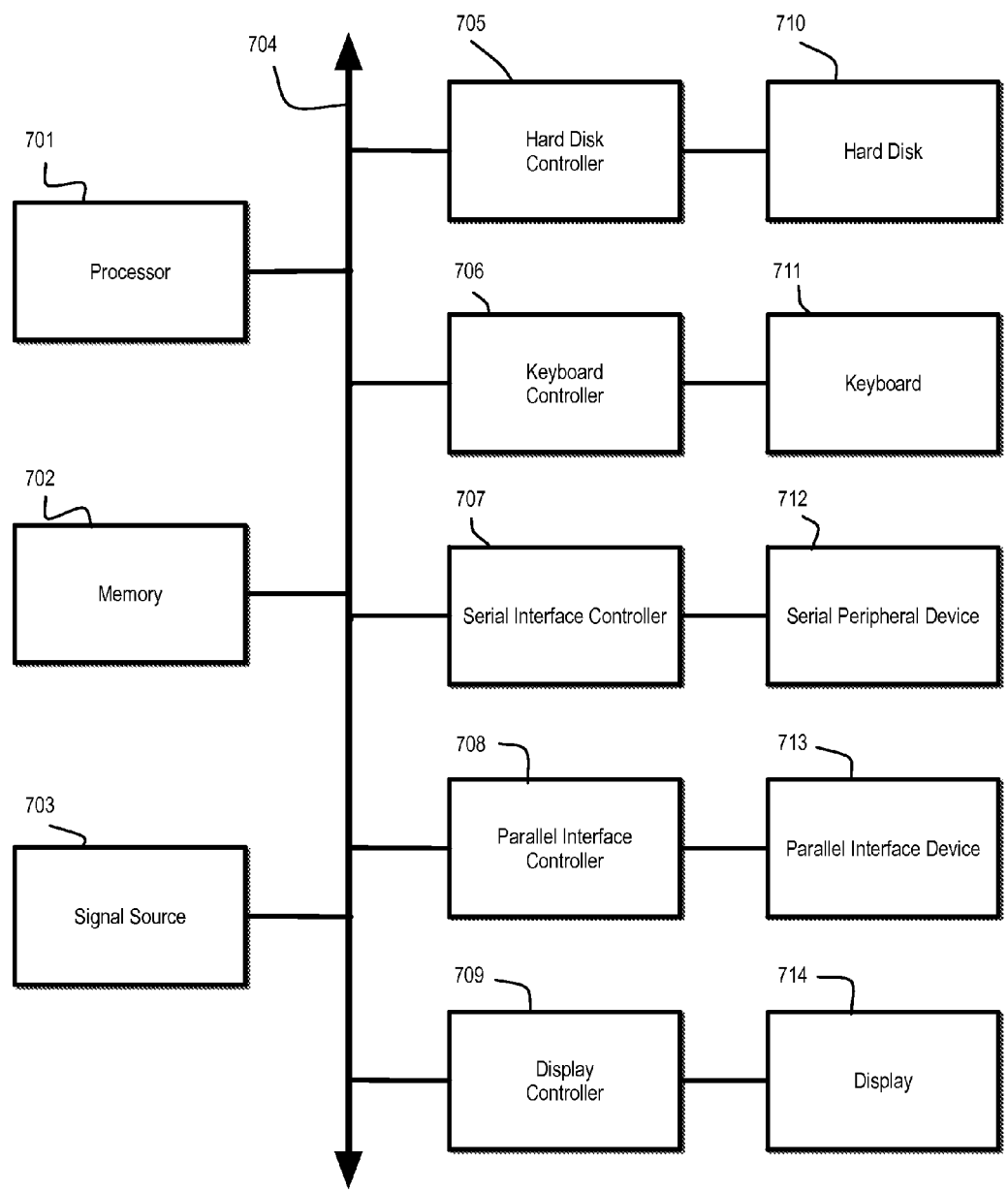
FIG. 7 is a block diagram depicting an exemplary computer system for training a deep neural network model according to an embodiment of the present disclosure.

For example, FIG. 7 is a block diagram depicting an exemplary computer system for training a deep neural network according to an embodiment of the present disclosure. It should be understood that FIG. 7 can be representative of a master node and/or a worker node according to an exemplary embodiment of the present disclosure. The computer system shown in FIG. 7 includes a processor 701, memory 702, signal source 703, system bus 704, Hard Drive (HD) controller 705, keyboard controller 706, serial interface controller 707, parallel interface controller 708, display controller 709, hard disk 710, keyboard 711, serial peripheral device 712, parallel peripheral device 713, and display 714.

In these components, the processor 701, memory 702, signal source 703, HD controller 705, keyboard controller 706, serial interface controller 707, parallel interface controller 708, display controller 709 are connected to the system bus 704. The hard disk 710 is connected to the HD controller 705. The keyboard 711 is connected to the keyboard controller 706. The serial peripheral device 712 is connected to the serial interface controller 707. The parallel peripheral device 713 is connected to the parallel interface controller 708. The display 714 is connected to the display controller 709.

In different applications, some of the components shown in FIG. 7 can be omitted. The whole system shown in FIG. 7 is controlled by computer readable instructions, which are generally stored in the hard disk 710, EPROM or other nonvolatile storage such as software. The software can be downloaded from a network (not shown in the figures), stored in the hard disk 710. Alternatively, a software downloaded from a network can be loaded into the memory 702 and executed by the processor 701 so as to complete the function determined by the software.

The processor 701 may be configured to perform one or more methodologies described in the present disclosure, illustrative embodiments of which are shown in the above figures and described herein. Embodiments of the present disclosure can be implemented as a routine that is stored in memory 702 and executed by the processor 701 to process the signal from the signal source 703. As such, the computer system is a general-purpose computer system that becomes a specific purpose computer system when executing the routine of the present disclosure.

Although the computer system described in FIG. 7 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method for training a neural network, the method comprising:
   receiving labeled training data at a master node;
   generating, by the master node, partitioned training data from the labeled training data and a held-out set of the labeled training data;
   determining a plurality of gradients for the partitioned training data, wherein the determination of the gradients is distributed across a plurality of worker nodes;
   determining a plurality of curvature matrix-vector products over a plurality of samples of the partitioned training data, wherein the determination of the plurality of curvature matrix-vector products is distributed across the plurality of worker nodes; and
   determining, by the master node, a second-order optimization of the plurality of gradients and the plurality of curvature matrix-vector products,
   wherein the second-order optimization forms a plurality of quadratic approximations of a loss function corresponding to the gradients determined by the worker nodes, the plurality of quadratic approximations of the loss function being formed using the curvature matrix-vector products, the second-order optimization selecting, from the plurality of quadratic approximations, a quadratic approximation determined to reduce a loss on the held-out set of the labeled training data, and producing a trained neural network having network parameters corresponding to the quadratic approximation selected, wherein the trained neural network is configured to perform a structured classification task.

2. The method of claim 1, further comprising assigning, by the master node, the partitioned training data to the plurality of worker nodes.

3. The method of claim 1, further comprising coordinating, by the master node, activity of the plurality of worker nodes.

4. The method of claim 1, wherein the second-order optimization comprises a Hessian-free optimization.

5. The method of claim 1, wherein the trained neural network comprises a plurality of nodes connected by a plurality of edges, wherein the second-order optimization determines weights for the plurality of edges, and wherein the weights are the network parameters.

6. The method of claim 1, further comprising generating, by the master node, the held-out set of the labeled training data, wherein determining the second-order optimization further comprises the iterative steps of:
   determining an actual loss for the gradient of the quadratic approximation selected based on the held-out set of the labeled training data; and
   adjusting a damping parameter according to a comparison of the actual loss to a predicted loss of the quadratic approximation selected, wherein the damping parameter controls the quadratic approximation.

7. The method of claim 1, wherein the master node and the plurality of worker nodes constitute a computer system configured to produce the trained neural network, wherein the plurality of worker nodes perform data-parallel computations to determine the plurality of gradients and curvature matrix-vector products, and wherein the master node performs a computation to determine the second-order optimization.

8. A computer program product for training a neural network, the computer program product comprising a non-transitory computer readable storage medium having program code embodied therewith, the program code readable by a processor to:
   receive labeled training data;
   generate partitioned training data from the labeled training data and a held-out set of the labeled training data;
   assign the partitioned training data to a plurality of worker nodes;
   receive a plurality of gradients and a plurality of curvature matrix-vector products from the plurality of worker nodes; and
   determine a second-order optimization of the plurality of gradients and the plurality of curvature matrix-vector products, using the held-out set and a damping parameter determined using the held-out set, producing a trained neural network configured to perform a structured classification task using a sequence-discriminative criterion.

9. The computer program product of claim 8, wherein the processor coordinates activity of the plurality of worker nodes.

10. The computer program product of claim 8, wherein the second-order optimization comprises a Hessian-free optimization.

11. The computer program product of claim 8, wherein the processor generates the held-out set of the labeled training data, and determines the second-order optimization by determining an actual loss for a current gradient of a quadratic approximation of a loss function based on the held-out set of the labeled training data, and adjusting the damping parameter according to a comparison of the actual loss to a predicted loss of the current quadratic approximation of the loss function, wherein the damping parameter controls the quadratic approximation.

12. The computer program product of claim 8, wherein the trained neural network comprises a plurality of nodes connected by a plurality of edges, wherein the second-order optimization determines weights for the plurality of edges, and wherein the weights are the network parameters.

13. A system for training deep neural network acoustic models comprising:
   a plurality of distributed worker computing devices configured to perform data-parallel computation of gradients and curvature matrix-vector products for partitioned training data generated from labeled training data; and
   a master computing device connected to the plurality of distributed worker computing devices by inter-process communication flow, wherein the master computing device is configured to determine a second-order optimization given the gradients and the curvature matrix-vector products and to coordinate activity of the plurality of distributed worker computing devices,
   wherein the second-order optimization forms a plurality of quadratic approximations of a loss function corresponding to the gradients determined by the distributed worker computing devices, the plurality of quadratic approximations of the loss function being formed using the curvature matrix-vector products, the second-order optimization selecting, from the plurality of quadratic approximations, a quadratic approximation determined to reduce a loss on a held-out set of the labeled training data, and producing a trained neural network having network parameters corresponding to the quadratic approximation selected, wherein the trained neural network is configured to perform a structured classification task.

14. The system of claim 13, wherein the plurality of distributed worker computing devices are each configured to:
   receive partitioned training data from the master computing device;
   determine the gradients for the partitioned training data; and
   determine the curvature matrix-vector products over the partitioned training data.

15. The system of claim 13, wherein the master computing device is configured to:
   receive the labeled training data;
   generate the partitioned training data from the labeled training data and the held-out set of the labeled training data;
   assign the partitioned training data to the plurality of distributed worker computing devices; and
   receive the gradients and the curvature matrix-vector products from the plurality of distributed worker computing devices.

16. The system of claim 13, wherein the master computing device coordinates activity of the plurality of distributed worker computing devices.

\* \* \* \* \*